A. FULLERTON.
APPARATUS FOR DESICCATING EGGS.
APPLICATION FILED JUNE 3, 1908.
916,139.
Patented Mar. 23, 1909.
2 SHEETS—SHEET 1.
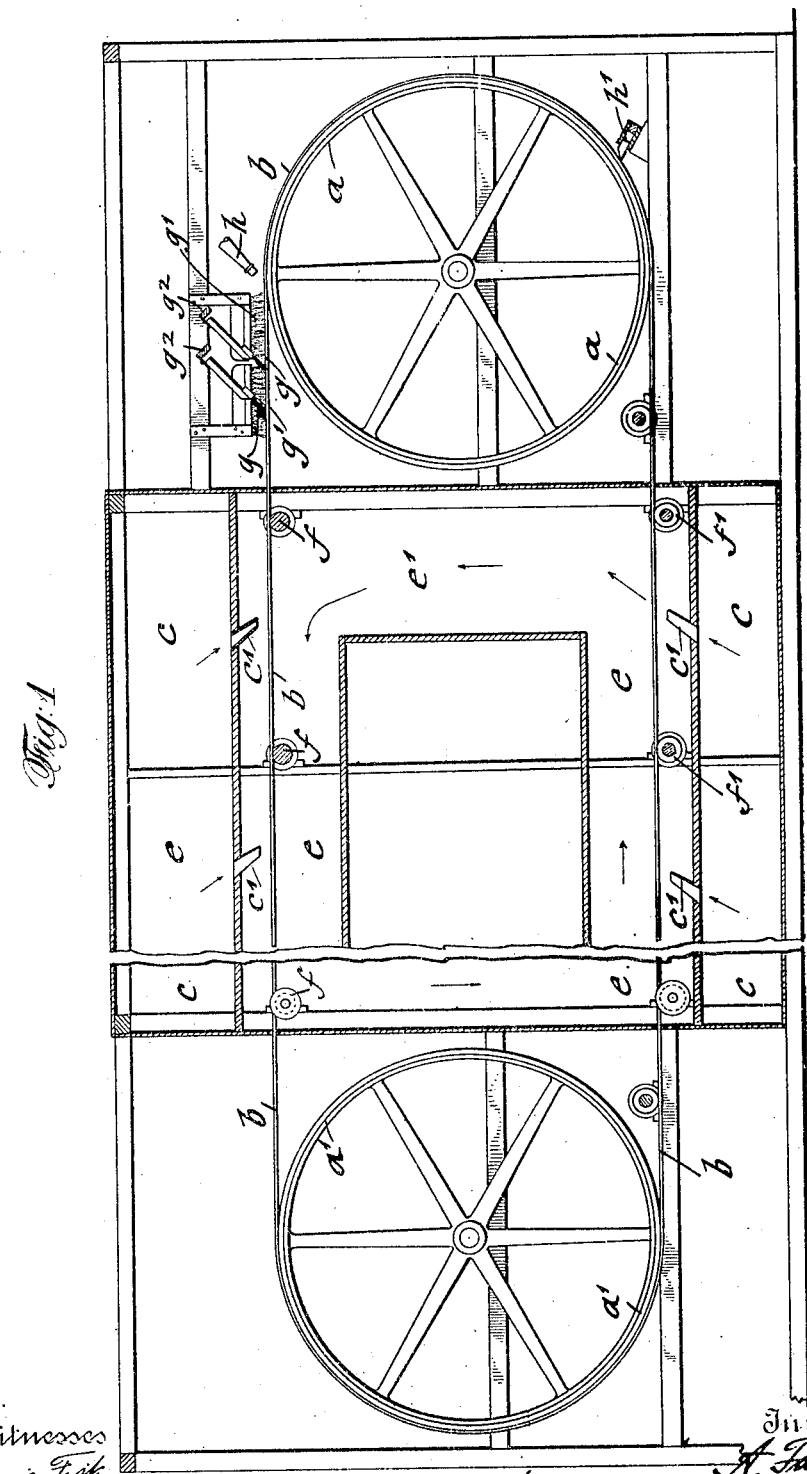

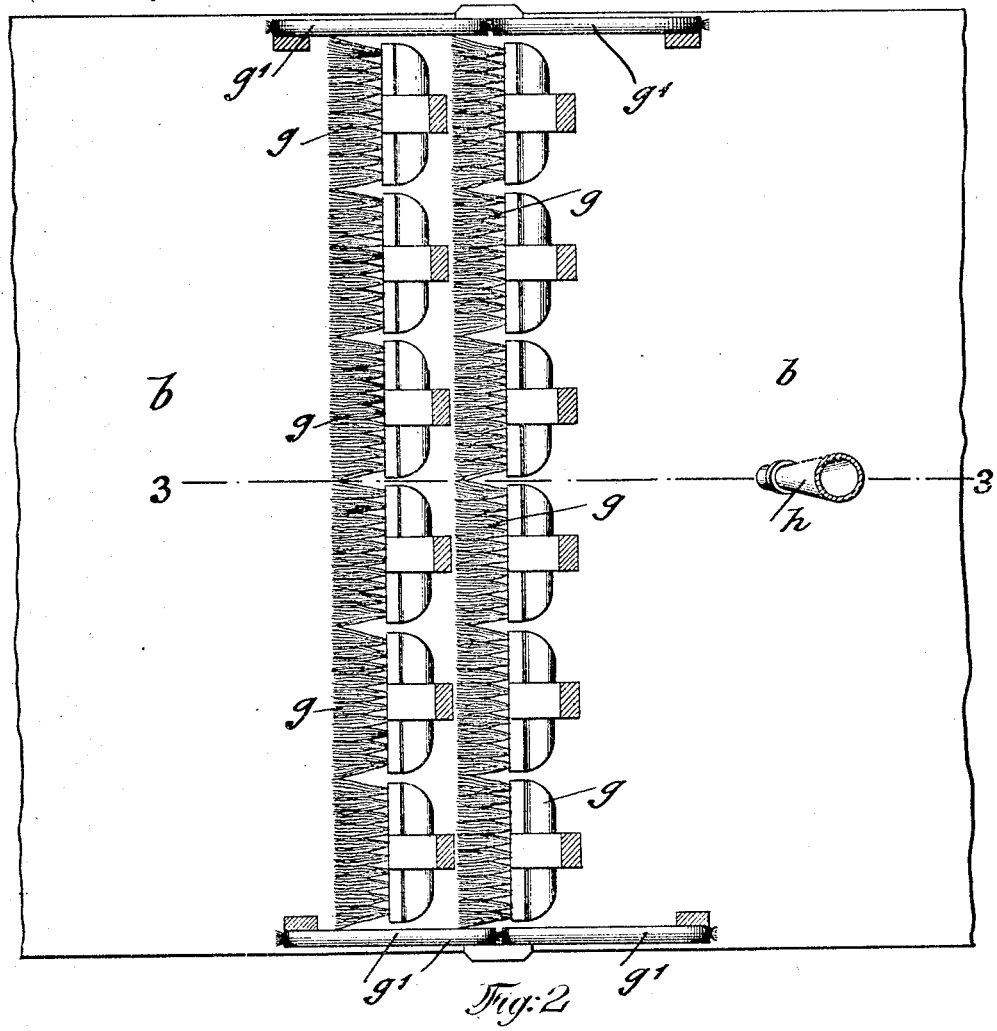
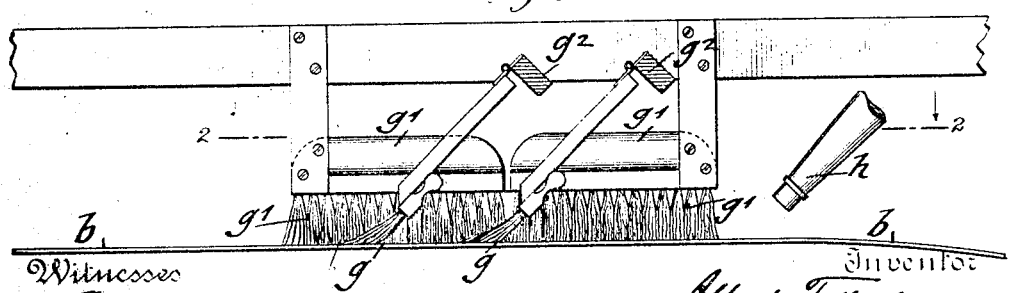

UNITED STATES PATENT OFFICE.

ALBERT FULLERTON, OF SIOUX CITY, IOWA, ASSIGNOR TO NATIONAL BAKERS' EGG CO., OF SIOUX CITY, IOWA, A CORPORATION OF MISSOURI.

APPARATUS FOR DESICCATING EGGS.

No. 916,139.  Specification of Letters Patent.  Patented March 23, 1909.

Application filed June 3, 1908. Serial No. 436,837.

*To all whom it may concern:*

Be it known that I, ALBERT FULLERTON, a citizen of the United States, residing at Sioux City, in the county of Woodbury and State of Iowa, have invented certain new and useful Improvements in Apparatus for Desiccating Eggs, of which the following is a specification.

This invention relates to certain improvements in apparatus for desiccating eggs, and more especially to improvements in the feeding and spreading of the film of egg on the traveling belt or carrier of the apparatus; and for this purpose the invention consists of an apparatus for desiccating eggs which comprises an endless traveling belt, drums for supporting the same, means for supplying egg to the upper horizontal run of the traveling belt, and a spreading device for the liquid egg near the point of supply of the same, said spreading device being composed of a number of rows of hinged distributing brushes arranged in conjunction with retaining brushes located at both sides along the edges of the belt for retaining the egg and keeping the edges of the belt clear of the same.

In the accompanying drawings, Figure 1 represents a vertical longitudinal section of my improved apparatus for desiccating eggs, showing the general arrangement of the same, Fig. 2 represents a detail top-view of the egg-feeding and egg-spreading devices; and Fig. 3 is a vertical section on line 3, 3, Fig. 2.

Similar letters of reference indicate corresponding parts.

Referring to the drawings, $b$ represents an endless traveling belt made of sheet-metal, preferably zinc, which is conducted over two drums $a$, $a^1$, one at each end. The shaft of the drums is supported in bearings on the framework and driven by suitable power so as to rotate the belt over the drums. The belt passes through suction air-ducts. Above the upper suction-duct $e$ and below the lower suction-air ducts $e$ are arranged hot-air ducts $c$ through which the heated air from a suitable heat-source is supplied by means of inclined nozzles $c^1$ which are located in close proximity to the belt in the suction-air duct $e$. The upper run of the belt is supported by a number of solid roller-carriers $f$ which are placed at some distance from each other on transverse shafts that turn in bearings on the framework of the apparatus, the ends of the rollers being flanged for serving to guide the edges of the belt while passing through the suction-ducts. The lower run of the belt is supported on carrier-disks $f^1$ having narrow faces which turn in contact with the dried and hardened surface of the film of eggs.

At the ingoing-end of the traveling belt $b$, at the point where the horizontal portion of the upper run of the belt commences, are located transversely across the belt several rows $g$ of inclined brushes, preferably two rows. Immediately in front of the distributing brushes one or more feed-pipes $h$ for the liquid egg are arranged, the egg being delivered on the belt at a point in front of the first row of brushes. The belt carries the egg supplied by the feed-pipes to the brushes which spread the same in a thin film over the belt. Alongside of the opposite edges of the belt, adjacent to the inclined end brushes, are arranged retaining brushes $g^1$, two of which are shown, which are placed at right angles to the transverse rows of brushes and parallel with the edges of the belt, as shown in Figs. 2 and 3. The brushes $g^1$ act in the nature of dams for retaining the egg on the belt and preventing its running over the edges of the same. They also keep the edges of the belt clear of egg. The rows of brushes $g$ are arranged at a short distance from each other at an inclination to the belt, as shown in Fig. 3, the brushes being hinged in any suitable manner to strips $g^2$ supported on the frame work of the apparatus. By hinging the brushes independently from each other, they can readily pass over any inequalities in the belt. The thickness of the egg-film is determined by the quantity of egg that is permitted to flow and be deposited on the belt from the feed-pipe or pipes $h$. When a thin film is required, a smaller quantity of egg is permitted to flow on the belt while when a thicker film is required a larger quantity of egg is deposited on the belt. The traveling belt carries the film of egg distributed uniformly over the same by the spreading brushes through the drying chambers and over the drum at the opposite end of the belt, back through the drying chambers at the lower part of the apparatus and back to a scraping device $h^1$ arranged at the lower part of the belt about vertically below the feeding and spreading devices described, so as to scrape off the dried film of egg and collect the same in a suitable receptacle ready for storage, shipment and eventual use.

Having thus described my invention, I claim as new and desire to secure by Letters Patent:

1. An apparatus for desiccating eggs, comprising an endless traveling belt, a feed-device at the horizontal portion of the upper run of the belt, rows of spreading brushes arranged transversely to the belt, and retaining brushes arranged at right angles to the transverse brushes along both edges of the belt.

2. An apparatus for desiccating eggs, consisting of an endless traveling belt, a feed-pipe or pipes located at the horizontal portion of the ingoing upper run of the belt for supplying the liquid egg to the surface of the belt, an egg-spreading device consisting of a plurality of individually-hinged, inclined brushes arranged transversely across the belt, and upright retaining brushes arranged along both edges of the belt adjacent to the inclined brushes for preventing the egg from running over the edges of the belt.

In testimony, that I claim the foregoing as my invention, I have signed my name in presence of two subscribing witnesses.

ALBERT FULLERTON.

Witnesses:
   PAUL GOEPEL,
   HENRY J. SUHRBIER